(12) United States Patent
Hinsley et al.

(10) Patent No.: US 7,597,189 B2
(45) Date of Patent: Oct. 6, 2009

(54) CAP SORTER AND ASSOCIATED CLEAT

(75) Inventors: Dan Davis Hinsley, Maysville, GA (US); Arnold D. Cotney, III, Athens, GA (US)

(73) Assignee: Fowler Products Company LLC, Athens, GA (US)

( * ) Notice: Subject to any disclaimer, the term of this patent is extended or adjusted under 35 U.S.C. 154(b) by 223 days.

(21) Appl. No.: 11/586,036

(22) Filed: Oct. 25, 2006

(65) Prior Publication Data

US 2008/0190736 A1    Aug. 14, 2008

(51) Int. Cl.
*B65G 13/02* (2006.01)
*B65G 15/42* (2006.01)
*B65G 25/00* (2006.01)
*B65G 29/00* (2006.01)

(52) U.S. Cl. .................. 198/690.2; 198/699; 198/699.1; 198/688.1

(58) Field of Classification Search .................. 198/396, 198/397.01, 396.06, 393
See application file for complete search history.

(56) References Cited

U.S. PATENT DOCUMENTS

| | | | |
|---|---|---|---|
| 2,809,742 A * | 10/1957 | Holz | ........................... 198/697 |
| 4,042,099 A | 8/1977 | Sterling | |
| 4,735,343 A | 4/1988 | Herzog | |
| 5,333,716 A | 8/1994 | Hoppmann et al. | |
| 5,333,718 A | 8/1994 | Pannell et al. | |
| 5,586,637 A * | 12/1996 | Aidlin et al. | ........... 198/397.06 |
| 2005/0204764 A1* | 9/2005 | Lomp | ......................... 62/239 |

FOREIGN PATENT DOCUMENTS

JP        0252822       10/1988

* cited by examiner

*Primary Examiner*—Gene Crawford
*Assistant Examiner*—Yolanda Cumbess
(74) *Attorney, Agent, or Firm*—Thompson Hine LLP

(57) ABSTRACT

A cap sorter for lifting and orienting caps includes a hopper section for holding randomly oriented caps. A conveyor belt travels along a belt path that extends through the hopper section. The belt path extending from the hopper section and moving upward therefrom. A plurality of spaced apart cleat attachment locations are located along a length of the conveyor belt, each cleat attachment location formed by a plurality of button members extending from an outer surface of the conveyor belt. Each button member includes an enlarged head portion. Each cleat attachment location has a cleat attached thereto with each cleat having a plurality of slots for matingly engaging with a corresponding one of the button members to removably hold the cleat to the conveyor belt when the enlarged head of the button member is located at a securing location of its corresponding slot. Each button member is movable along its corresponding slot to a removal location of the slot so as to enable the cleat to be separated from the conveyor belt by movement of the cleat relative to the conveyor belt. A cap removal station is located toward an upper part of the conveyor belt path for removing oriented caps from cleats.

17 Claims, 6 Drawing Sheets

CAP SORTER AND ASSOCIATED CLEAT

TECHNICAL FIELD

The present application relates to cap sorters and more particularly to a cap sorter with one or more cleats for lifting and orienting caps.

BACKGROUND

Caps (e.g., screw-on caps) for container closures are often sorted as part of an automated container filling operation where the caps are used to close filled containers. U.S. Pat. No. 5,586,637 to Aidlin et al., for example, describes a conveying system for lifting and orienting multi-diameter, push-pull bottle caps. The conveying system includes a conveyor belt and a plurality of elongated rods on the conveying system that extend in the cross-machine direction. A plurality of stepped cleats are in releasable attachment with the elongated rods through a sliding, trapezoidal, mating relationship. The stepped cleats described by Aidlin et al. are slid across the length of the elongated rods and over the ends of the elongated rod to either remove the stepped cleat from or attach the stepped cleat to the rod. Either end of stepped cleats may be slid over the elongated rod so that the stepped cleats may be attached to the elongated rods in multiple orientations.

SUMMARY

In an aspect, a cap sorter for lifting and orienting caps includes a hopper section for holding randomly oriented caps. A conveyor belt travels along a belt path that extends through the hopper section. The belt path extends from the hopper section and moves upward therefrom. A plurality of spaced apart cleat attachment locations are located along a length of the conveyor belt, each cleat attachment location formed by a plurality of button members extending from an outer surface of the conveyor belt. Each button member includes an enlarged head portion. Each cleat attachment location has a cleat attached thereto with each cleat having a plurality of slots for matingly engaging with a corresponding one of the button members to removably hold the cleat to the conveyor belt when the enlarged head of the button member is located at a securing location of its corresponding slot. Each button member is movable along its corresponding slot to a removal location of the slot so as to enable the cleat to be separated from the conveyor belt by movement of the cleat relative to the conveyor belt. A cap removal station is located toward an upper part of the conveyor belt path for removing oriented caps from cleats.

In another aspect, a method of sorting caps using a cap sorter is provided. The method includes forming a plurality of cleat attachment locations by attaching a plurality of button members to a conveyor belt, each button member including an enlarged head portion. A plurality of cleats are connected to the conveyor belt spaced-apart from each other in a machine direction, the cleats being located at the cleat attachment locations formed by the plurality of button members extending from an outer surface of the conveyor belt. Each cleat has a plurality of slots for matingly engaging with a corresponding one of the button members to removably hold the cleat to the conveyor belt when the enlarged head of the button member is located at a securing location of its corresponding slot. Each button member is movable along its corresponding slot to a removal location of the slot so as to enable the cleat to be separated from the conveyor belt by movement of the cleat relative to the conveyor belt.

In another aspect, a cap sorter for lifting and orienting caps includes a hopper section for holding randomly oriented caps. A conveyor belt travels along a belt path that extends through the hopper section, the belt path extending from the hopper section and moving upward therefrom. A plurality of button members extend from an outer surface of the conveyor belt, the plurality of button members defining a plurality of spaced apart cleat attachment locations along a length of the conveyor belt. Each button member includes an enlarged head portion. A cleat is attached at each attachment location. Each cleat has a plurality of slots for matingly engaging with a corresponding one of the button members to removably hold the cleat to the conveyor belt when the enlarged head of the button member is located at a securing location of its corresponding slot. Each button member serves as a guidepost through its corresponding slot to a removal location of the slot so as to enable the cleat to be separated from the conveyor belt by movement of the cleat relative to the conveyor belt.

The details of one or more embodiments are set forth in the accompanying drawings and the description below. Other features, objects, and advantages will be apparent from the description and drawings, and from the claims.

DETAILED DESCRIPTION

Figure 1:
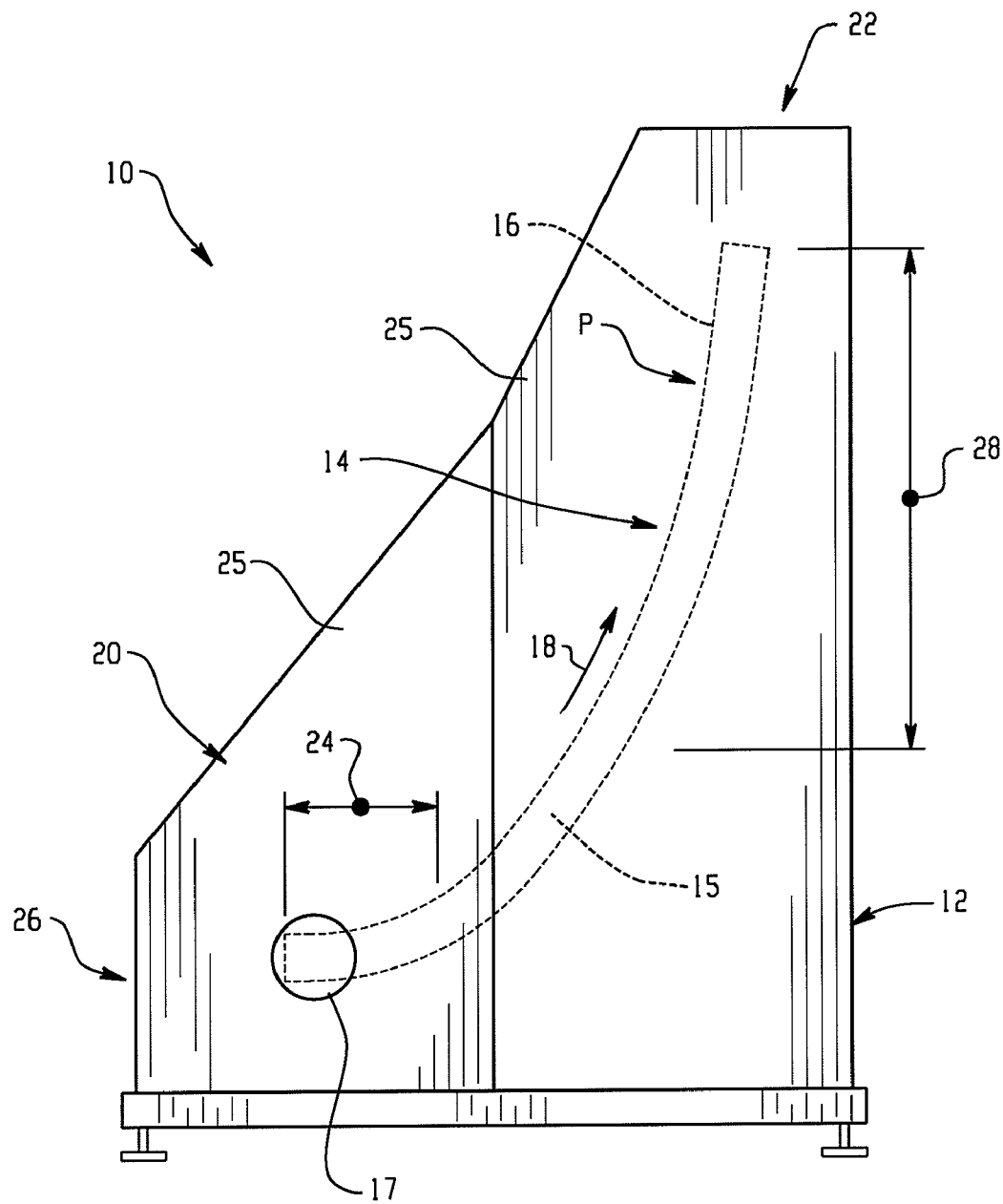
FIG. 1 is a diagrammatic, side view of an embodiment of a cap sorter.

Referring to FIG. 1, a cap sorter 10 includes a housing 12 and conveyor system 14 including a conveyor support (referred to generally as element 15) that supports a conveyor belt 16 and a drive system (referred to generally as element 17) that moves the conveyor belt 16 in a machine direction represented by arrow 18, which is the direction of travel of the conveyor belt during a cap sorting portion of travel of the conveyor belt. Cap sorter 10 further includes a hopper 20 which holds caps prior to their transport along the conveyor path P toward a top 22 of the cap sorter using the conveyor belt 16. A cap removal station is located at the top of the conveyor path P near top 22 of the cap sorter 10.

Conveyor belt 16 is formed of multiple, articulated sections that are connected together to form the length of the conveyor belt. While conveyor path P is illustrated as a curve having a relatively horizontal portion 24 near a front 26 of the cap sorter 10 and a relatively vertical portion 28 near the top 22 of the cap sorter, the conveyor path may be of any suitable shape, such as a relatively straight horizontal portion near front 26 and a relatively straight vertical portion near top 22 and an angled portion that provides a transition between the horizontal and vertical portions of the path P. Cap sorter 10 may further include various other components, such as a blower or mechanical arm located at the top 22 of the cap sorter for moving caps from the conveyor belt 16 during operation, a control system for controlling operation of the cap sorter including drive system 17, one or more front panels 25 (e.g., that are hinged) that allow access into the cap sorter, etc.

Figure 2:
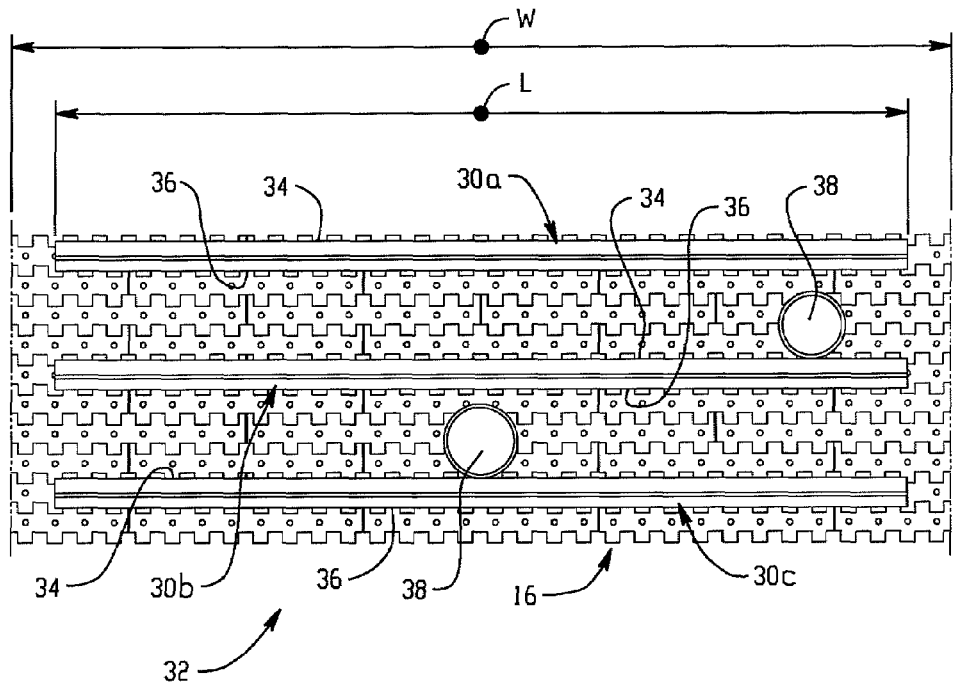
FIG. 2 is a top view of an embodiment of a section of a conveyor belt for use with the cap sorter of FIG. 1.

Referring to FIG. 2, the conveyor belt 16 includes multiple cleats 30*a*, 30*b* and 30*c* that are spaced-apart from each other in the machine direction. For simplicity, only section 32 of the conveyor belt 16 is shown, however, cleats 30 may be connected at multiple or even all of the sections forming the conveyor belt. Also, while three cleats 30 are shown connected to section 32, more than three or less than three cleats may be connected to one or more of the sections of the conveyor belt 16. The number of cleats 30 per section 32 may depend on the size (e.g., diameter) of the caps 38.

Each cleat 30*a*, 30*b*, 30*c* includes a working edge 34 and a non-working edge 36. The working edges 34 face the machine direction while the non-working edges 36 face the opposite direction. By "working edge", we mean the edge that supports and engages the caps 38 during operation in transporting the caps from the hopper 20 to the top 22 of the cap sorter 10 (FIG. 1).

As can be seen by FIG. 2, the cleats 30*a*, 30*b*, 30*c* extend lengthwise in the cross-machine direction. The length L of the cleats 30*a*, 30*b*, 30*c* is less than the width W of the section 32, however, the length L of the cleats may be about the same as the width W of the section 32.

Figure 3:
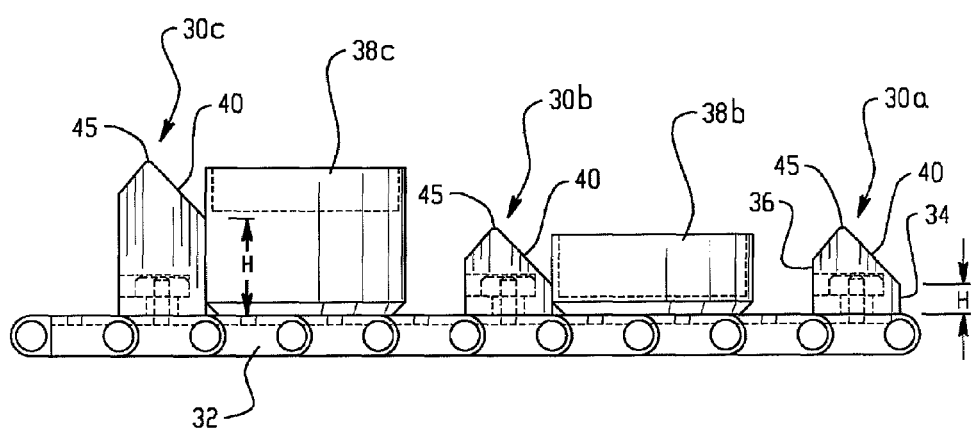
FIG. 3 is a side view of the section of the conveyor belt of FIG. 2.

Referring now to FIG. 3, the height H of the working edge 34 of the cleat 30*a*, 30*b*, 30*c* may be selected to accommodate a cap 38 of a particular height. In the illustrated embodiment, cleat 30*c* has a working edge height H that is greater than cleats 30*a* and 30*b* to accommodate cap 38*c* of greater height than cap 38*b*. In other embodiments, all of the cleats 30*a* 30*b*, 30*c* may have the same height H. Cleats 30*a*, 30*b* and 30*c* each have a tapered portion 40 that leads to an apex 45 of the cleat. The height H of the working edge 34 of cleats 30*a*, 30*b* and 30*c* can allow at least some of the caps 38 (e.g., that are too tall or improperly oriented) to fall off of the respective cleat during transport through the vertical portion of the path P (FIG. 1) for selective picking of the caps.

Figure 4:
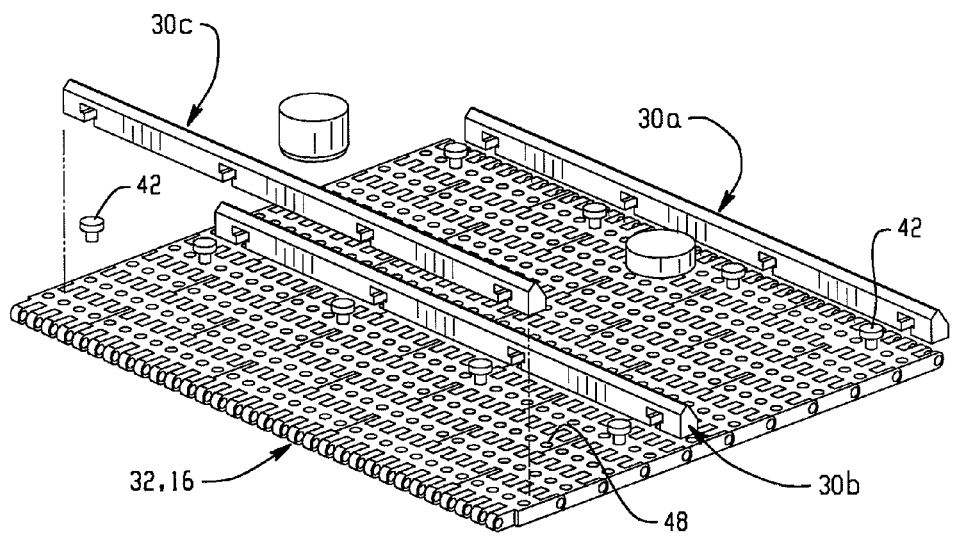
FIG. 4 is a perspective, partially exploded view of the section of the conveyor belt of FIG. 2.
Figure 5:
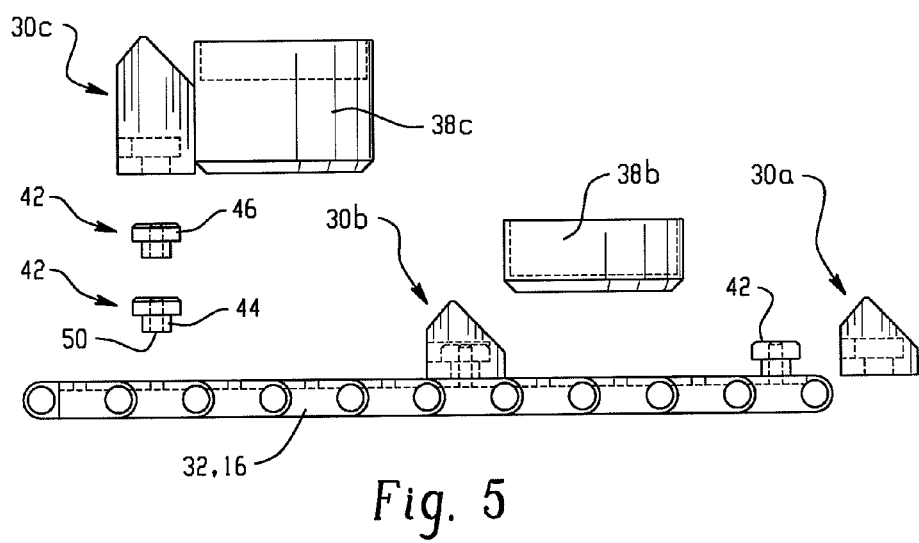
FIG. 5 is a side, partially exploded view of the section of the conveyor belt of FIG. 2.

Referring briefly to FIGS. 4 and 5, as noted above, the cleats 30*a*, 30*b* and 30*c* are removably connected to the section 32 of the conveyor belt 16. Cleats 30*a*, 30*b*, 30*c* are connected to the section 32 using button members 42. Button members 42 are T-shaped in cross-section and include a stem portion 44 and an enlarged head portion 46. Other button member shapes are contemplated such as mushroom shaped, L-shaped, etc. The button members 42 are fixed to the section 32 using fasteners (not shown) that are inserted through an opening 48 in the section of the conveyor 16 and into a bore 50 (e.g., threaded) extending into the stem portion 44 of the button member. In other embodiments, the button members 42 may be press fit (or glued) directly into the openings 48 or otherwise connected to the conveyor belt 16. Placement of the button members 42 on the section 32 defines an attachment location for the cleats 30*a*, 30*b*, 30*c*.

Figure 6:
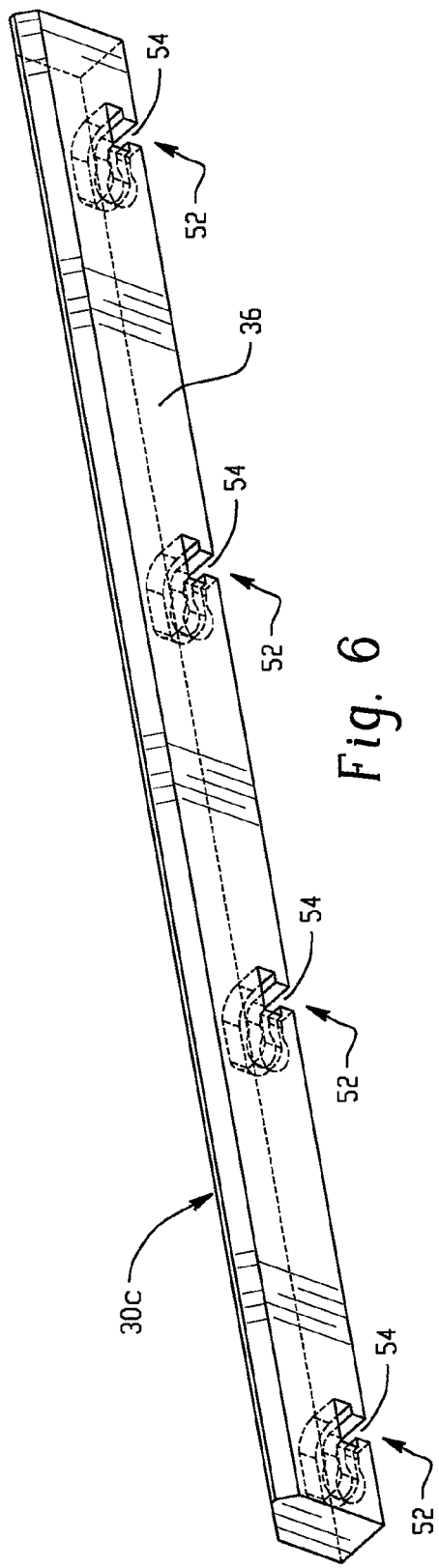
FIGS. 6-8 are perspective, rear and bottom views, respectively, of an embodiment of a cleat.
Figure 7:
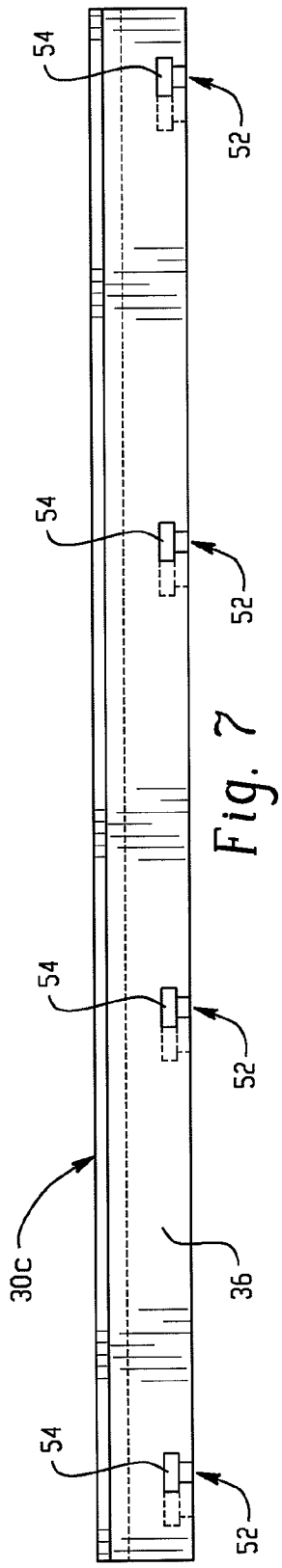
Figure 8:
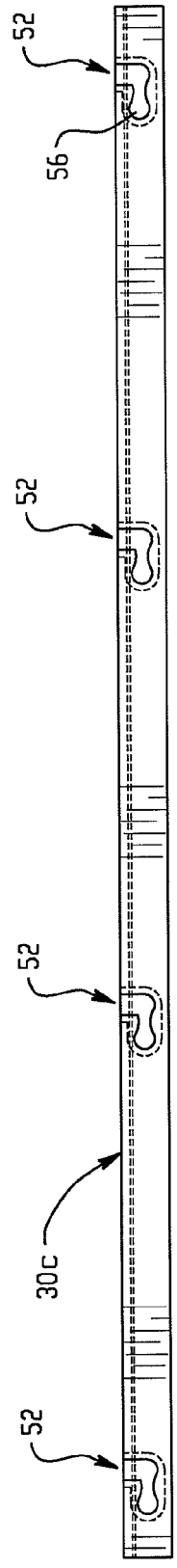

Referring to FIGS. 6-8, cleats 30*a* and 30*c* are connected to the section 32 using slots 52 that each matingly engage a corresponding one of the button members 42. Each slot includes a non-working edge opening 54 and a bottom opening 56. Shown most clearly by FIG. 7, opening 54 is T-shaped, corresponding to the cross-sectional shape of the button member 42. Shown most clearly by FIG. 8, bottom opening 56 is L-shaped, extending inwardly from the non-working edge 36 and then along the length of the cleat 30 toward an end 58.

Figure 9:
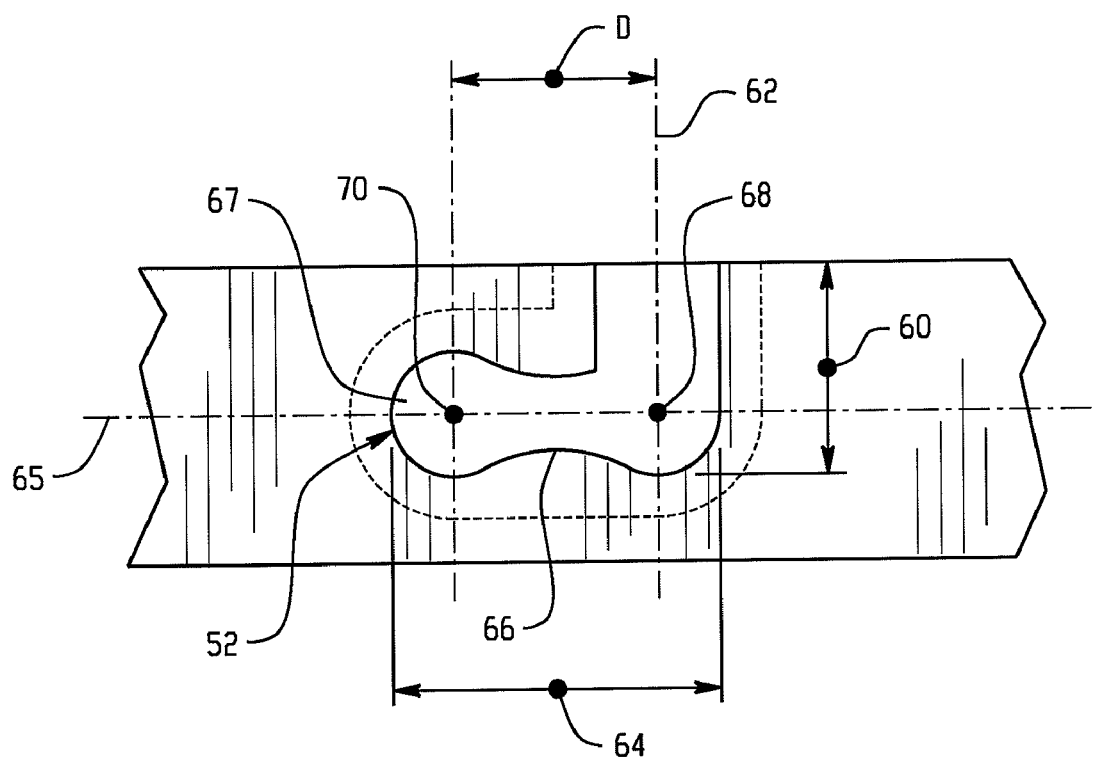
FIG. 9 is a detail view of an embodiment of a slot of the cleat of FIG. 6.

Referring to FIG. 9, slot 52 includes a first portion 60 having a machine direction axis 62 and a second portion 64 having a cross-machine direction axis 65. Second portion 64 includes a necked down location 66 defining a button retaining structure and a securing location 67. The necked down location 66 serves to inhibit lateral movement (i.e., cross-machine movement) of the cleat 30 on its associated button members 42, which can enhance security of the position of the cleat on the belt and can eliminate any need for other restraining mechanisms.

First portion 60 includes a removal location 68, in this embodiment, where the axes 62 and 66 meet. In some embodiments, the distance D between a center point 70 of the securing location 67 and removal location 68 is less than about three inches, such as less than about two inches, such as less than about one inch, such as about one-half inch.

Figure 10:
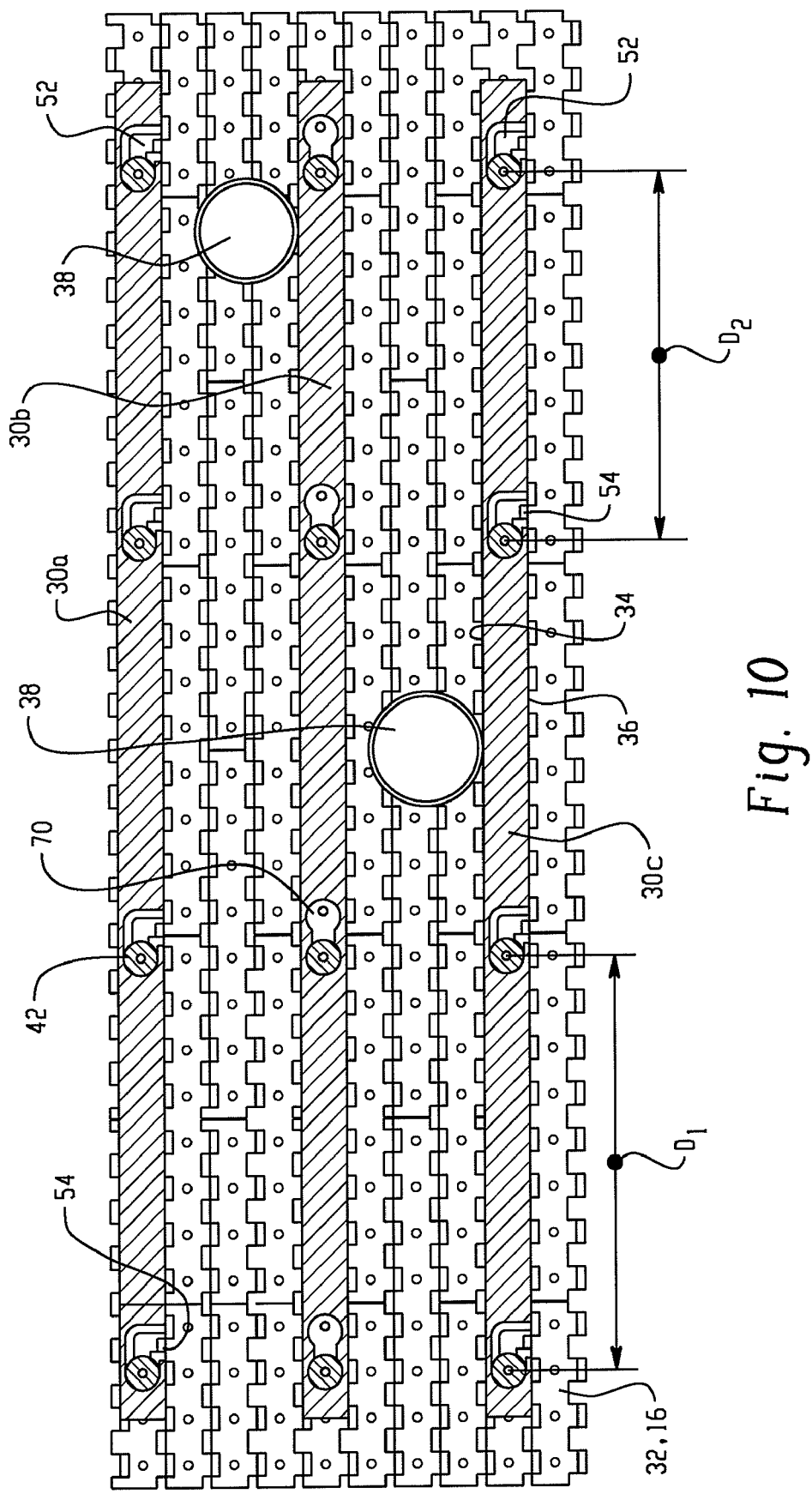
FIG. 10 is a top, section view of the section of the conveyor belt of FIG. 2.

FIG. 10 illustrates the cleats 30*a*, 30*b* and 30*c* connected to the section 32 of the conveyor belt 16. As can be seen, only cleats 30*a* and 30*c* include L-shaped slots 52. Cleat 30*b* illustrates an alternative cleat embodiment described hereafter. Cleats 30*a* and 30*c* are connected to the section 32 by aligning the button members 42 with the non-working edge openings 54 and moving the cleats 30*a* and 30*c* linearly in a direction opposite the machine direction until the button members 42 reach the removal location 68 (FIG. 9). Then the cleats 30*a* and 30*c* are moved in the cross-machine direction a relatively short distance (e.g., about three inches or less, about two inches of less, about one inch or less, about one-half inch), overcoming the button retaining structure, until the button members 42 reach their respective securing locations 68.

To prevent connecting the cleats 30*a* and 30*c* the wrong way (i.e., with the non-working edge 36 facing the machine direction), distances $D_1$ and $D_2$ between button members 42 (and the corresponding distances between the slots 52) may be different. In the illustrated example, $D_1$ is greater than $D_2$. This arrangement can be advantageous as the working edge 34 may be of a different height than the non-working edge 36 of the cleat.

Figure 11:
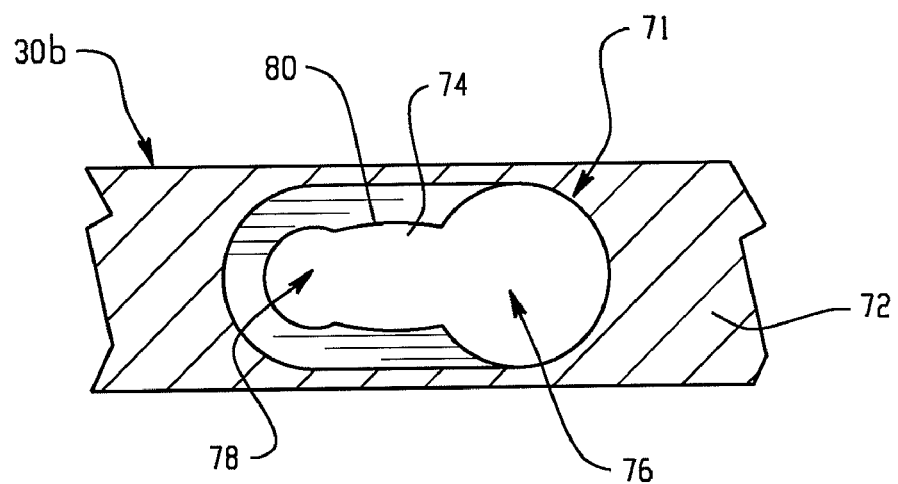
FIG. 11 is a top, section, detail view of another embodiment of a slot.

Referring also to FIG. 11, cleat 30*b* shows an alternative slot 70 structure that is keyhole shaped and extends into the cleat only from the bottom 72 and not from the non-working edge 36. Slot 70 includes bottom opening 74 having an enlarged portion 76 for receiving the head portion 46 of the button member 42, a securing portion 78 for trapping the head portion 46, and a button retaining structure 80. Cleat 30*b* is connected to the section 32 of the conveyor belt 16 by aligning the enlarged portions 76 of the bottom openings 74 with the button members 42, inserting the head portions 46 of the button members 42 into the slots 70 and moving the cleat 30*b* in the cross-machine direction until the button members 42 are trapped in the securing location as shown by FIG. 10.

Cleats 30 and button members 42 may be formed of any suitable material such as metal or plastic and formed by any suitable process such as molding, machining, etc.

The above-described cleat attachment structures provide for relatively simple and easy-to-use cleat attachment and removal. The cleats 30 have relatively short slots so that the cleats have to be manipulated only a short distance once the button members 42 are located within the slots. Additionally, the above-described arrangements can prevent connecting the cleats 30 the wrong way with their non-working edges facing the machine direction.

It is to be clearly understood that the above description is intended by way of illustration and example only and is not intended to be taken by way of limitation, and that changes and modifications are possible. Four example, while each cleat 30a, 30b and 30c are illustrated as including four slots for receiving four button members, more or less than four slots (and button members) may be provided. Accordingly, other embodiments are within the scope of the following claims.

What is claimed is:

1. A cap sorter for lifting and orienting caps, comprising:
a hopper section for holding randomly oriented caps;
a conveyor belt traveling along a belt path that extends through the hopper section, the belt path extending from the hopper section and moving upward therefrom, a plurality of spaced apart cleat attachment locations along a length of the conveyor belt, each cleat attachment location formed by a plurality of button members extending from an outer surface of the conveyor belt, each button member including an enlarged head portion, each cleat attachment location having a cleat attached thereto, each cleat having a plurality of slots for matingly engaging with a corresponding one of the button members to removably hold the cleat to the conveyor belt when the enlarged head of the button member is located at a securing location of its corresponding slot, each button member movable along its corresponding slot to a removal location of the slot so as to enable the cleat to be separated from the conveyor belt by movement of the cleat relative to the conveyor belt; and
a cap removal station located toward an upper part of the conveyor belt path for removing oriented caps from cleats;
wherein each cleat includes a working edge and a non-working edge, the button members and slots are spaced such that the button members and slots will only align for engagement when the working edge of the cleat faces toward a travel direction of the conveyor belt so that the cleat will only attaches to the conveyor belt with its working edge facing toward the travel direction of the conveyor belt.

2. The cap sorter of claim 1, wherein a distance between the securing location and the removal location of each slot is less than three inches.

3. The cap sorter of claim 1, wherein a distance between the securing location and the removal location of each slot is less than two inches.

4. The cap sorter of claim 1, wherein a distance between the securing location and the removal location of each slot is less than one inch.

5. The cap sorter of claim 1, wherein the slots of each cleat open to a bottom side of the cleat.

6. The cap sorter of claim 1, wherein the slots of each cleat open to a side edge of the cleat.

7. The cap sorter of claim 1, wherein at least one slot of each cleat includes a button retaining structure.

8. A cap sorter for lifting and orienting caps, comprising:
a hopper section for holding randomly oriented caps;
a conveyor belt traveling along a belt path that extends through the hopper section, the belt path extending from the hopper section and moving upward therefrom, a plurality of spaced apart cleat attachment locations along a length of the conveyor belt, each cleat attachment location formed by a plurality of button members extending from an outer surface of the conveyor belt, each button member including an enlarged head portion, each cleat attachment location having a cleat attached thereto, each cleat having a plurality of slots for matingly engaging with a corresponding one of the button members to removably hold the cleat to the conveyor belt when the enlarged head of the button member is located at a securing location of its corresponding slot, each button member movable along its corresponding slot to a removal location of the slot so as to enable the cleat to be separated from the conveyor belt by movement of the cleat relative to the conveyor belt; and
a cap removal station located toward an upper part of the conveyor belt path for removing oriented caps from cleats;
wherein each cleat includes a working edge and a non-working edge, the button members and slots are spaced such that the cleat only attaches to the conveyor belt with its working edge facing toward a travel direction of the conveyor belt;
wherein the slot either (i) includes a first portion extending inwardly from a non-working edge of the cleat and a second portion substantially transverse to the first portion forming a somewhat L-shape or (ii) extends inwardly from a bottom of the cleat and includes an enlarged portion for receiving the enlarged head of the button member and a securing portion that traps the enlarged head of the button member within the slot forming a somewhat keyhole shape.

9. A method of sorting caps using a cap sorter, the method comprising:
forming a plurality of cleat attachment locations by attaching a plurality of button members to a conveyor belt such that a first pair of adjacent button members of at least one cleat attachment location are spaced apart from each other a first distance in a cross-conveying direction that is greater than a second distance that a second pair of button members of the at least one cleat attachment location are spaced apart from each other in the cross-conveying direction, each button member including an enlarged head portion; and
connecting a plurality of cleats to the conveyor belt spaced-apart from each other in a machine direction, the cleats being located at the cleat attachment locations formed by the plurality of button members extending from an outer surface of the conveyor belt, each cleat having a plurality of slots for matingly engaging with a corresponding one of the button members to removably hold the cleat to the conveyor belt when the enlarged head of the button member is located at a securing location of its corresponding slot, each button member movable along its corresponding slot to a removal location of the slot so as to enable the cleat to be separated from the conveyor belt by movement of the cleat relative to the conveyor belt;
wherein the step of connecting the plurality of cleats to the conveyor belt includes either (i) maneuvering a cleat in a somewhat L-shaped pattern with button members located within associated slots of the cleat or (ii) aligning an enlarged portion of openings extending inwardly from a bottom of a cleat with corresponding enlarged heads of the button members.

10. The method of claim 9 further comprising moving the conveyor along a belt path extending from a hopper section of the cap sorter and upwardly therefrom.

11. The method of claim 10 further comprising removing caps carried by the cleats at a cap removal station located toward an upper part of the conveyor belt path.

12. The method of claim 9, wherein the slots of the cleat include a first portion extending inwardly from a non-working edge of the cleat and a second portion substantially transverse to the first portion forming a somewhat L-shape.

13. The method of claim 9, wherein the slots of the cleat include the enlarged portion and a securing portion that is smaller than the enlarged portion for trapping the enlarged head of the button member within the slot.

14. A cap sorter for lifting and orienting caps, comprising:
a hopper section for holding randomly oriented caps;
a conveyor belt traveling along a belt path that extends through the hopper section, the belt path extending from the hopper section and moving upward therefrom;
a plurality of button members extending from an outer surface of the conveyor belt, the plurality of button members defining a plurality of spaced apart cleat attachment locations along a length of the conveyor belt, each button member including an enlarged head portion;
a cleat attached at each attachment location, each cleat including a working edge that faces in a machine direction, a non-working edge that faces opposite the machine direction and a bottom that faces the conveyor belt, each cleat having a plurality of slots for matingly engaging with a corresponding one of the button members to removably hold the cleat to the conveyor belt when the enlarged head of the button member is located at a securing location of its corresponding slot, wherein at least some of the slots have a non-working edge opening open to the open edge of the associated cleat and a bottom opening open to the bottom of the associated cleat, the bottom openings having a first portion with a machine direction axis and a second portion with a cross-machine direction axis;
wherein each button member serves as a guidepost through its corresponding slot to a removal location of the slot so as to enable the cleat to be separated from the conveyor belt by movement of the cleat relative to the conveyor belt.

15. The cap sorter of claim 14, wherein a distance between the securing location and the removal location of each slot is less than one inch.

16. The cap sorter of claim 14 wherein the button members and slots are spaced such that the cleat only attaches to the conveyor belt with its working edge facing toward a travel direction of the conveyor belt.

17. The cap sorter of claim 14, wherein the non-working edge opening and the bottom opening are the only two openings of the at least some of the slots.

* * * * *